(12) United States Patent
Ichikawa

(10) Patent No.: US 9,333,838 B2
(45) Date of Patent: May 10, 2016

(54) ROUTING STRUCTURE OF OPERATION CABLE

(71) Applicant: Alpha Corporation, Yokohama-shi, Kanagawa (JP)

(72) Inventor: Shinji Ichikawa, Yokohama (JP)

(73) Assignee: ALPHA CORPORATION, Kanagawa (JP)

(*) Notice: Subject to any disclaimer, the term of this patent is extended or adjusted under 35 U.S.C. 154(b) by 0 days.

(21) Appl. No.: 14/766,143

(22) PCT Filed: Feb. 25, 2014

(86) PCT No.: PCT/JP2014/054481
§ 371 (c)(1),
(2) Date: Aug. 6, 2015

(87) PCT Pub. No.: WO2014/141869
PCT Pub. Date: Sep. 18, 2014

(65) Prior Publication Data
US 2016/0001643 A1 Jan. 7, 2016

(30) Foreign Application Priority Data
Mar. 12, 2013 (JP) .................................. 2013-049371

(51) Int. Cl.
*E06B 3/00* (2006.01)
*B60J 5/04* (2006.01)
(Continued)

(52) U.S. Cl.
CPC .............. *B60J 5/0468* (2013.01); *E05B 61/00* (2013.01); *E05B 77/04* (2013.01); *E05B 77/06* (2013.01);
(Continued)

(58) Field of Classification Search
CPC .......... B60J 5/0468; E05B 61/00; E05C 1/14; E05C 3/162; E05F 7/00
USPC .......................................................... 49/503
See application file for complete search history.

(56) References Cited

U.S. PATENT DOCUMENTS 5,605,363 A * 2/1997 Kapes ........................... 292/196
7,192,076 B2 * 3/2007 Ottino ........................ 296/146.1
(Continued)

FOREIGN PATENT DOCUMENTS

EP 1 783 308 A2 5/2007
GB 2261916 A * 6/1993 .............. E05B 65/20
(Continued)

OTHER PUBLICATIONS

Official Communication issued in International Patent Application No. PCT/JP2014/054481, mailed on May 27, 2014.
(Continued)

*Primary Examiner* — Jerry Redman
(74) *Attorney, Agent, or Firm* — Keating and Bennett, LLP

(57) ABSTRACT

The objective of the present invention is to provide a routing structure that is for an operation cable and that, with a simple structure, can route an operation cable (7) with sufficient excess length. The present invention has: a handle device (5) that is affixed to the door (1) of a vehicle and that causes the operation force to an operation handle (3) rotatably connected to a handle base (2) to be output from an output section (4); a door lock device (6) that is disposed in proximity to the output section (4) of the handle device (5); and an operation cable (7) that couples the output section (4) of the handle device (5) and the door lock device (6). The operation cable (7) is connected from the output section (4) to the door lock device (6) via an excess length securing pathway that is approximately one circuit of the perimeter of the handle device (5), and the operation cable (7) is movably supported by a guide section (9) provided to an intermediate position of a mobile member (8) of the handle device (5), and the connection section to the door lock device (6) of the operation cable (7), and on the handle base (2), and thus the ingress of the mobile member (8) into a mobile region is restricted.

5 Claims, 4 Drawing Sheets

(51) Int. Cl.
  *E05B 79/20* (2014.01)
  *E05B 85/16* (2014.01)
  *E05B 77/04* (2014.01)
  *E05B 79/22* (2014.01)
  *E05B 77/06* (2014.01)
  *E05B 77/36* (2014.01)
  *E05B 61/00* (2006.01)
  *E05C 1/14* (2006.01)
  *E05C 3/16* (2006.01)
  *E05F 7/00* (2006.01)

(52) U.S. Cl.
  CPC .............. *E05B 77/36* (2013.01); *E05B 79/20* (2013.01); *E05B 79/22* (2013.01); *E05B 85/16* (2013.01); *E05C 1/14* (2013.01); *E05C 3/162* (2013.01); *E05F 7/00* (2013.01)

(56) References Cited

U.S. PATENT DOCUMENTS 7,448,166 B2 * 11/2008 Vantrease ................ 49/503
8,069,616 B2 * 12/2011 Keller et al. .............. 49/506
2007/0069532 A1 3/2007 Tenorio et al.
2009/0243307 A1 10/2009 Lee
2014/0069225 A1 3/2014 Kudoh et al.

FOREIGN PATENT DOCUMENTS

| | | |
|---|---|---|
| JP | 4-43670 U | 4/1992 |
| JP | 6-28144 U | 4/1994 |
| JP | 2003-148004 A | 5/2003 |
| JP | 2007-118793 A | 5/2007 |
| JP | 2009-275371 A | 11/2009 |
| JP | 2012-237143 A | 12/2012 |
| WO | 2009/034035 A1 | 3/2009 |
| WO | 2011/072210 A1 | 6/2011 |

OTHER PUBLICATIONS

Official Communication issued in corresponding European Patent Application No. 14764725.9, mailed on Dec. 10, 2015.

* cited by examiner

ROUTING STRUCTURE OF OPERATION CABLE

TECHNICAL FIELD

The present invention relates to an operation cable routing structure.

BACKGROUND ART

A structure described in Patent Document 1 has been known as an operation cable routing structure for coupling a vehicle's handle device and door lock device that are disposed in proximity to each other.

In this conventional example, the handle device is formed by rotatably coupling an outside handle (operation handle) to a case (handle base), and transmits rotational force generated by a bellcrank as a result of operation of turning the operation handle to the door lock device through an operation cable.

In order to couple the output of the bellcrank to the door lock device with a sufficient extra distance therebetween in a layout where the bellcrank is situated at the tip end of the operation handle at the circumference of the rotation thereof and the door lock device is disposed in proximity to the bellcrank, the output of the bellcrank is led out once via a link to the base end of the operation handle at the center of the rotation thereof and one end of the operation cable is coupled to a lever coupled to the link.

PRIOR ART DOCUMENT

Patent Document

Patent Document 1: Japanese Patent Application Publication No. 2003-148004

SUMMARY OF THE INVENTION

Problem to be Solved by the Invention

Here, in the above conventional example, leading out the output of the bellcrank once to the opposite end makes the routing pathway of the operation cable long, thereby solving problems originating from an excessively short pathway length, but has a drawback that the structure is complicated.

Specifically, in the case where the routing pathway of the operation cable is excessively short, it is difficult to secure a sufficient extra length for the operation cable. This leads to problems such as decrease in the curvature of a bent section of the operation cable which causes excessively large operational resistance, and unintentional opening of the door lock device by the operation cable in the event of an accident or the like which deforms the door and changes the interval between the handle device and the door lock device. These problems may be solved by providing an extra length to the pathway, which, however, involves, for example, providing the link to the handle device and therefore makes the structure complicated.

The present invention has been made to solve the above drawback, and an objective thereof is to provide an operation cable routing structure with which an operation cable can be routed with a simple structure and also with a sufficient extra length.

Also, another objective of the present invention is to provide a handle device which is usable in the above structure.

Means for Solving the Problem

According to the present invention, the above objectives are achieved by providing an operation cable routing structure, including:

a handle device 5 that is affixed to a door 1 of a vehicle and that outputs, from an output section 4, operation force applied to an operation handle 3 rotatably coupled to a handle base 2;

a door lock device 6 that is disposed in proximity to the output section 4 of the handle device 5; and an operation cable 7 that couples the output section 4 of the handle device 5 and the door lock device 6, in which the operation cable 7 is coupled from the output section 4 to the door lock device 6 via an extra length securing pathway that substantially encircles the handle device 5, and the operation cable 7 is movably supported by a guide section 9 provided on the handle base 2 at an intermediate position between a part of the operation cable 7 and a movable member 8 of the handle device 5, to thereby be restricted from entering a motion range of the movable member 8, the part of the operation cable 7 being coupled to the door lock device 6.

In the present invention, the operation cable 7 is routed on the extra length securing pathway which surrounds substantially the entire handle device 5 along the periphery of the handle device 5, and a sufficient extra length is secured around the periphery of the handle device 5 even with the output section 4 of the handle device 5 and the door lock device 6 disposed in proximity to each other. For this reason, even when the interval therebetween changes due to deformation of the door 1 in an accident or the like, the extra length of the operation cable 7 absorbs the change. Hence, it is possible to ensure the prevention of the unintentional opening of the door 1 and the like, which would otherwise occur due to the change in the relative positions exerted as an operation force on the operation cable 7, without using any special members.

Moreover, providing the guide section 9 on the handle base 2 of the handle device 5 prevents the operation cable 7 from entering the motion range of the movable member 8 that is actuated when the operation handle 3 is operated. Hence, it is possible to prevent an actuation failure which would otherwise occur due to the operation handle 3 being caught on the movable member 8 when the movable member 8 is operated.

In addition, the guide section 9 movably supports the operation cable 7 such that the guide section 9 forms the operation cable 7 and does not restrict movement of the operation cable 7. Thus, even when the relative positions of the handle device 5 and the door lock device 6 change, the operation cable 7 moves relative to the guide section 9 to thereby supply an extra length portion. In this way, it is possible ensure the absorption of the dimensional change.

Here, the operation cable routing structure may be configured such that the guide section 9 is supports the operation cable 7 such that the operation cable 7 is capable of being separated from the guide section 9 when moved in a vehicle width direction. In this way, when the handle device 5 and the door lock device 6 move relative to each other in the vehicle width direction, which is a basic deformation mode in lateral collision, the operation cable 7 is separated from the guide section 9, so that the restriction on the operation cable 7 is completely released. This further ensures the supply of the extra length portion.

Further, the operation cable routing structure may be configured such that a sponge-like tube 10 is mounted on a section of the operation cable 7, the section being supported by the guide section 9. In this case, with the operation cable 7 supported by the guide section 9 with the sponge-like tube interposed therebetween, the tube, during normal routing work, is squeezed and deformed in conformity with the shape of the guide section 9, thereby preventing unintentional separation, whereas the tube, upon exertion of a large force such as deformation of the door 1, does not impede the necessary movement of the operation cable 7 and the guide section 9. Hence, the tube does not adversely affect the quality of solution of the dimensional change.

The above routing structure can use a handle device 5, including:

a handle base 2 that is affixed to a door 1 of a vehicle;

an operation handle 3 that is rotatably coupled to one end of the handle base 2; and an output section 4 including a counterweight 8 that is rotatably coupled to one side part of another end of the handle base 2, is rotationally driven by displacement of a tip end of the operation handle 3 at a circumference of rotation thereof, and cancels out an inertia force resulting from a lateral collision on the door, in which a peripheral section of the handle base 2 opposite a peripheral section thereof on which the output section 4 is pivoted is provided with a cable coupling section 11 to which one end of an operation cable 7 that brings displacement of the output section 4 out is coupled, and the peripheral section on which the output section 4 is pivoted is provided with a guide section 9 by which the operation cable 7 routed to surround substantially an entire periphery of the handle base 2 is movably supported to thereby be restricted from entering a motion range of the counterweight 8.

In this case, the handle device 5 may be configured such that the guide section 9 is formed in a rectangular plate shape and, at one side edge, supports the operation cable 7 such that the operation cable 7 is capable of being separated from the guide section 9 when moved in a vehicle width direction. In this way, it is possible to improve the quality of absorption of the dimensional change.

Effect of the Invention

According to the present invention, the operation cable 7 can be routed with a simple structure and also with a sufficient extra length.

MODE FOR CARRYING OUT THE INVENTION

Figure 1:
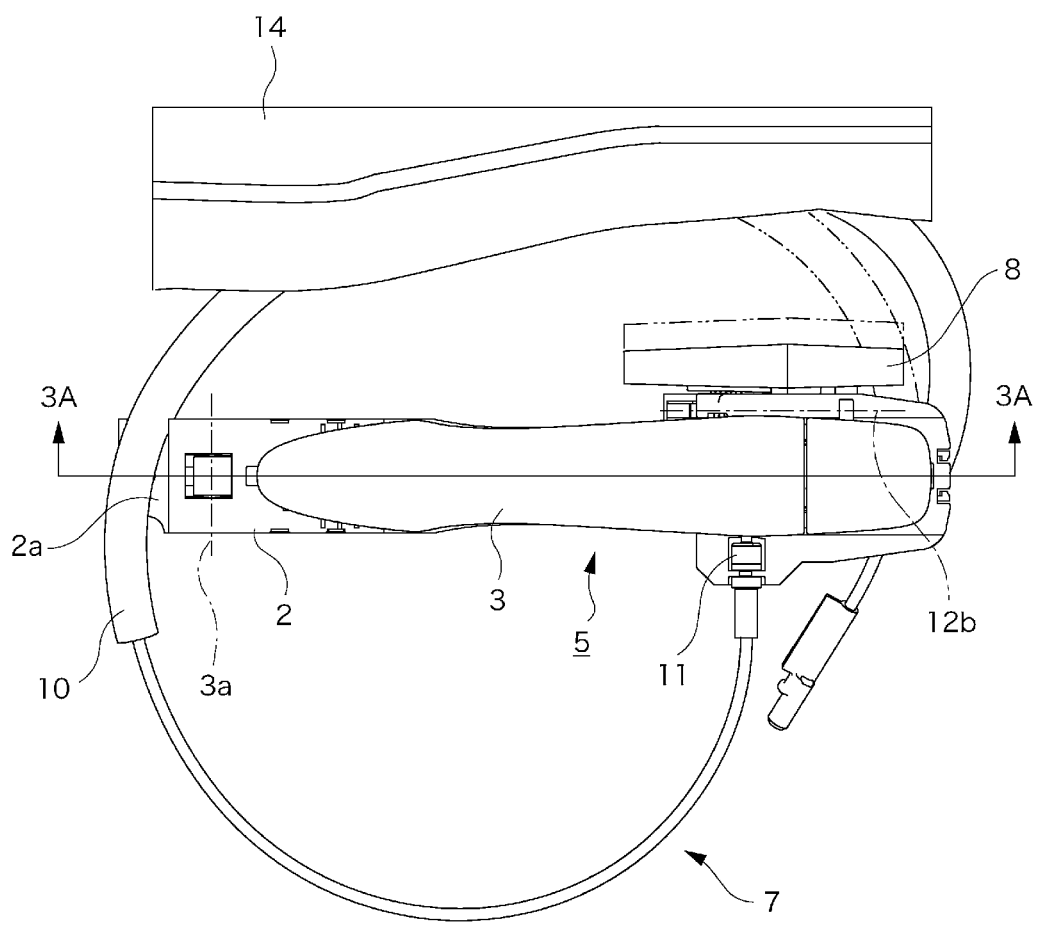
FIG. 1 is a front view showing the present invention.

FIG. 1 and the following figures show an embodiment of the present invention for coupling a vehicle's outside handle device 5 and door lock device 6 with an operation cable 7.

The handle device 5 is formed by coupling an operation handle 3 of a grip shape long in the vehicle length direction to a handle base 2. The handle device 5 is capable of turning operation between an initial rotational position shown in FIG. 3 and an operative rotational position to which the handle device 5 is rotationally operated in the direction of arrow A in FIG. 3 about a rotational center 3a formed at the end thereof at the front side of the vehicle (left side in FIG. 3).

Moreover, at the tip end of the operation handle 3 at the circumference of the rotation thereof, an operation leg 3b is formed to protrude toward the inside of a door 1. A lever 12 and a counterweight (movable member 8) are coupled to the handle base 2 rotatably about a rotation shaft 12b. The lever 12 includes an actuation piece 12a that is configured to be locked on the operation leg 3b. The counterweight 8 is coupled to the lever 12.

The lever 12 is capable of turning from an initial rotational position which corresponds to the initial rotational position of the operation handle 3 to an operative rotational position which corresponds to the operative rotational position of the operation handle 3. The lever 12 is urged toward the initial rotational position by urging force applied to the counterweight 8 by a torsion spring 13.

The counterweight 8 is disposed along one side edge of the handle base 2 and has a weight necessary to cancel out a force that operates the lever 12 toward its operative rotational position, the force originating from an inertia force in a direction of opening the door 1 of the vehicle that is exerted on the operation handle 3 when a lateral collisional force is applied to the door 1.

Figure 3:
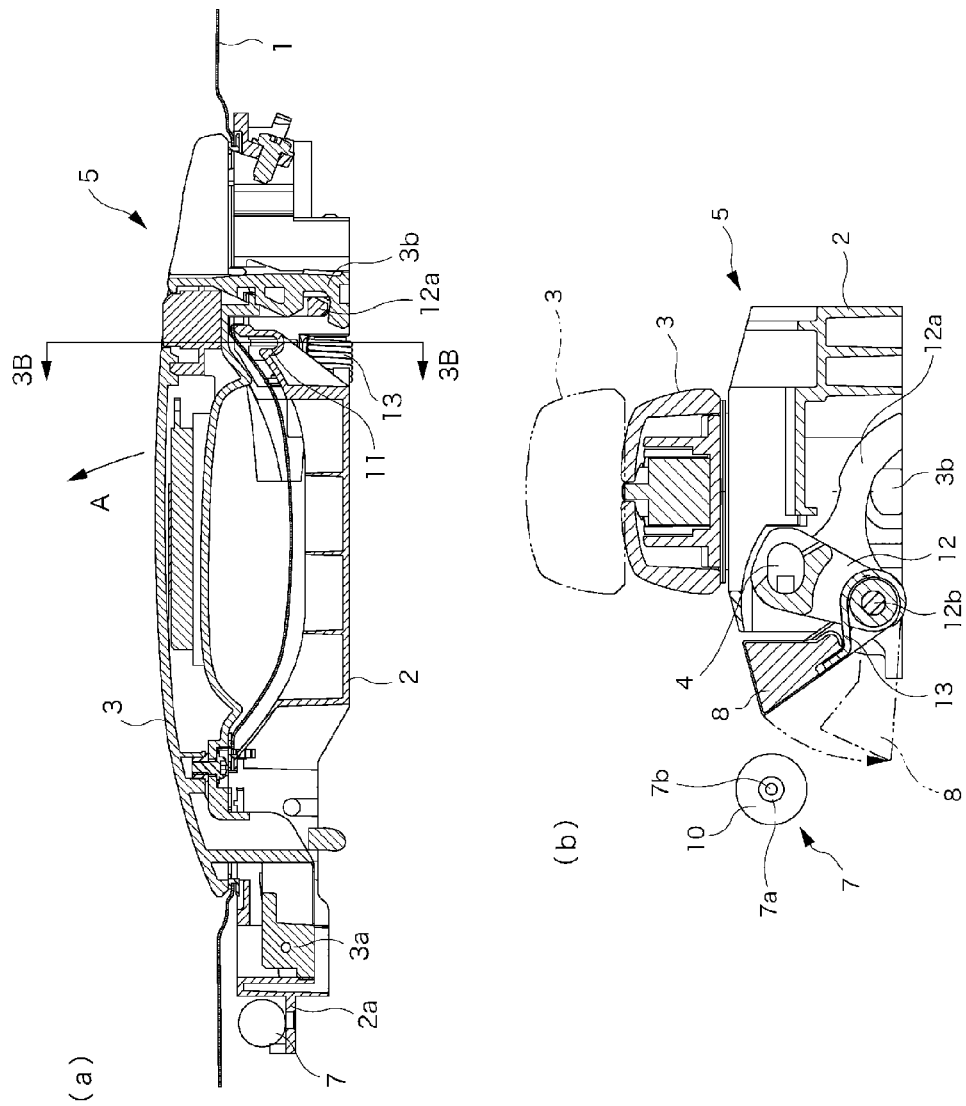
FIG. 3 is a set of views showing a handle device, and part (a) is a cross-sectional view taken along line 3A-3A in FIG. 1 and part (b) is a cross-sectional view taken along line 3B-3B in part (a) of FIG. 3.

As shown by chain lines in FIG. 3, in response to operation of turning the operation handle 3 from its initial rotational position to operative rotational position against the urging force from the torsion spring 13 mentioned above, the lever 12 turns from its initial rotational position to operative rotational position and thereby moves a coupling point (output section 4) provided on the lever 12.

Further, as shown in FIGS. 1 and 3, the handle base 2 is provided with a cable coupling section 11. The cable coupling section 11 serves as a section from which to lead out the operation cable 7 to be described later, and is disposed at the side edge of the handle base 2 opposite the side edge thereof at which the counterweight 8 is mounted, so as to prevent interference with the counterweight 8.

Figure 2:
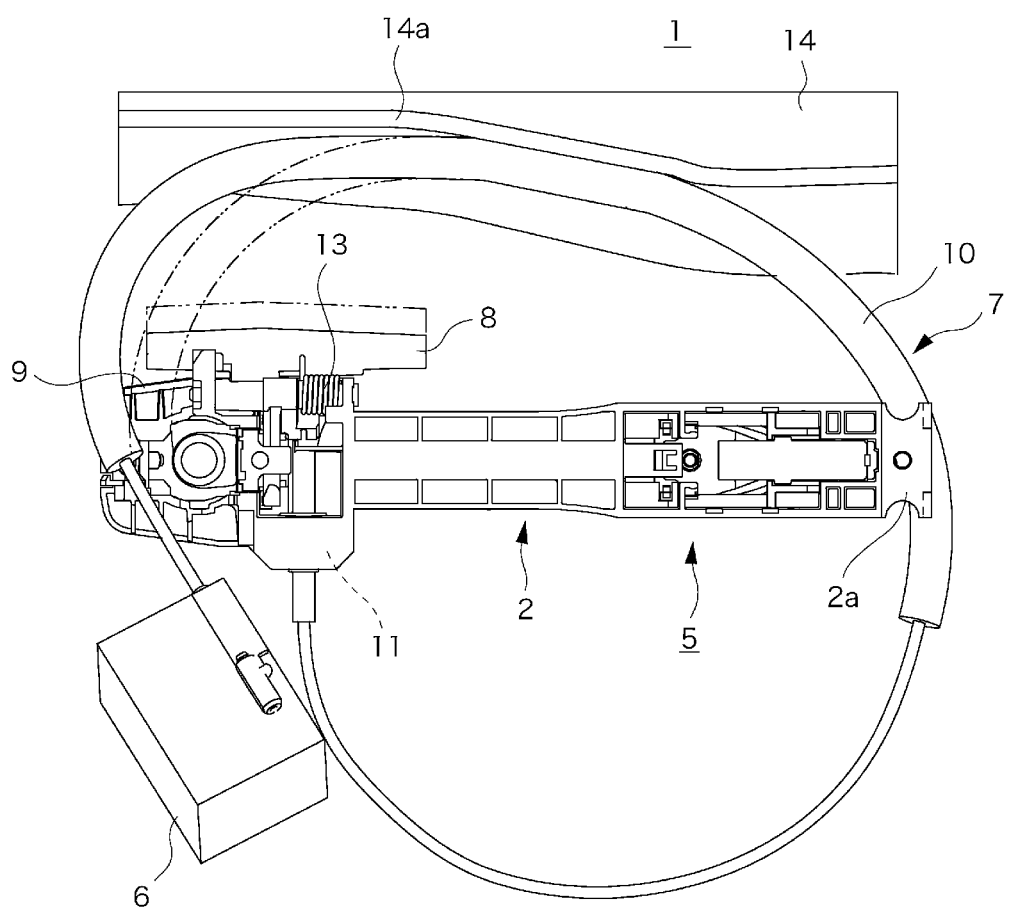
FIG. 2 is a back view showing the present invention.

On the other hand, the door lock device 6, which is operated by the handle device 5, includes a latch not shown for folding the door 1 in a closed posture. As shown in FIG. 2, the door lock device 6 is affixed to the door 1 at a position in proximity to the handle device 5 and is operated remotely by the handle device 5 transmitting operation force, which is applied to the handle device 5, through the operation cable 7.

The operation cable 7 is formed by slidably inserting an inner cable 7b into an outer cable 7a, as shown in FIG. 3, and coupled at one end to the handle device 5 and the other end to the door lock device 6. Moreover, the operation cable 7 is covered with a sponge-like tube 10 made of urethane form or like over an appropriate region in order to prevent noises generated by the operation cable 7 hitting a door panel (door 1) during travel and other similar situations.

The operation cable 7 is coupled to the handle device 5 by affixing one end of the outer cable 7a to the cable coupling section 11 mentioned above and by coupling the same end of the inner cable 7b to the coupling point 4 on the lever 12.

As shown in FIG. 2, the door lock device 6 is disposed in proximity to the section where the operation cable 7 is led out from the handle device 5. In the case where the handle device 5 and the door lock device 6 are coupled to each other directly by the operation cable 7, the cable routing distance may be excessively short and a bent section with an excessively small curvature may appear on the routing pathway, thereby making the operational resistance excessively large. In addition, in the event of a collision or the like that results in the widening of the interval between the handle device 5 and the door lock device 6, the interval between the connected ends of the inner cable 7b may be widened and the end of the inner cable 7b connected to the door lock device 6 may be pulled, thereby operating the door lock device 6 and unintentionally opening the door 1.

To avoid this, in this embodiment, the operation cable 7 is routed along an extra length securing pathway, as shown in FIGS. 1 and 2. The extra length securing pathway is a route that allows the operation cable 7 to be led out from the handle device 5 at the end at which the operation cable 7 is coupled thereto once to the opposite end (front end section), then guided to the rear end section along the side edge of the handle device 5 opposite its side edge where the cable coupling section 11 is disposed, and returned again to the side edge where the cable coupling section 11 is disposed. The extra length securing pathway therefore surrounds substantially the entire handle device 5. In this way, even when the relative positions of the handle device 5 and the door lock device 6 change, the operation cable 7 is supplied from the extra length securing pathway and absorbs the positional change, thereby preventing generation of an operation force to the door lock device 6.

In order to route the operation cable 7 along the extra length securing pathway, a cable holder 2a is formed at a front end section of the handle base 2 for clamping the operation cable 7 in cooperation with the panel of the door 1, as shown in part (a) of FIG. 3. Further, a corner section of the base end of the cable holder 2a functions as a guide.

Meanwhile, as shown in FIGS. 1 and 2, in the case of routing the operation cable 7 around the handle device 5, the operation cable 7 may possibly enter the motion range of the counterweight 8, as shown by broken lines. In this case, the operation cable 7 may be caught on the counterweight 8 when the operation handle 3 is operated, thereby possibly causing an actuation failure.

Figure 4:
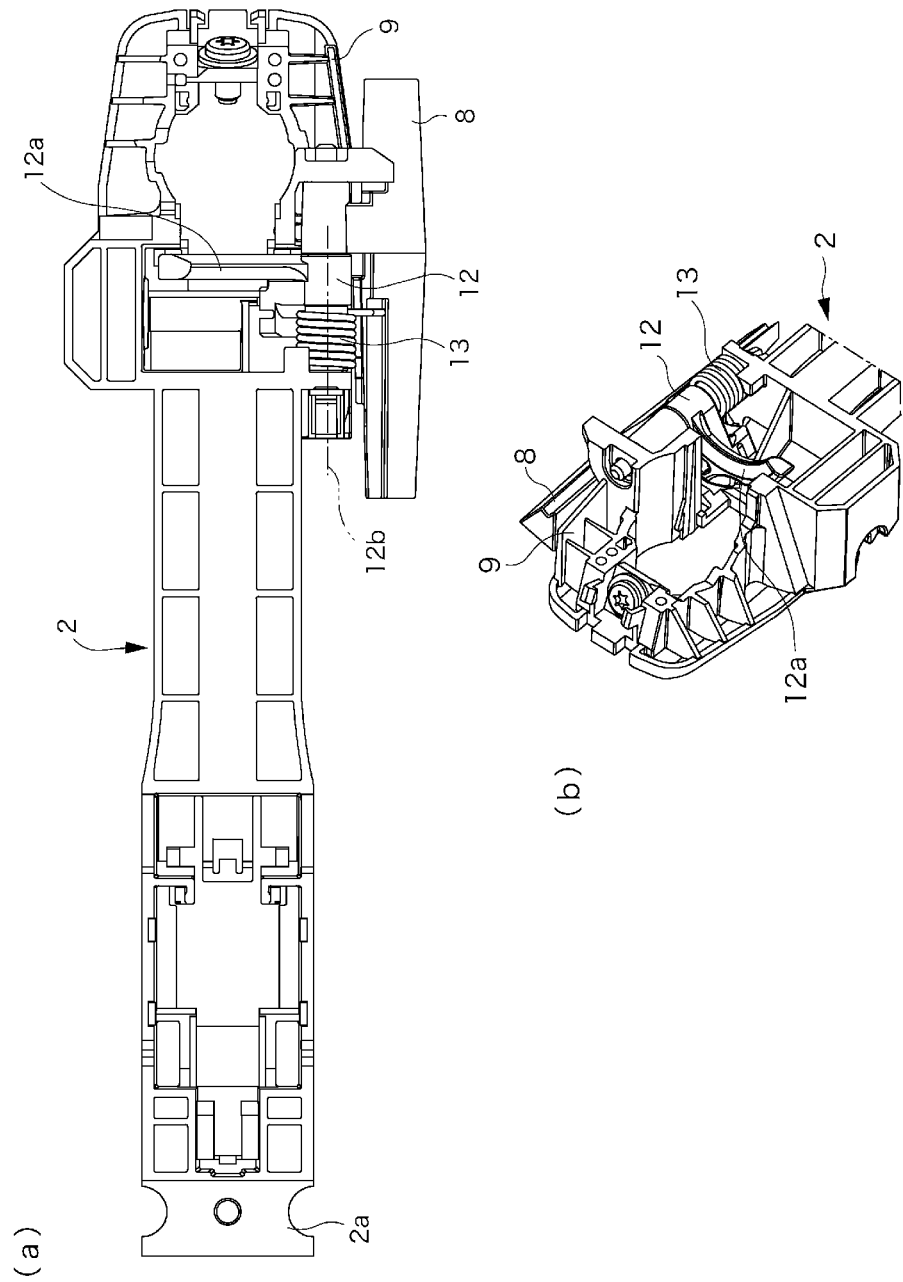
FIG. 4 is a set of views showing a handle base, and part (a) is a back view and part (b) is an enlarged perspective view of a main section.

To avoid this, in this embodiment, the handle base 2 is provided with a guide section 9. As shown in FIGS. 2 and 4, the guide section 9 is formed in a rectangular plate shape at the periphery on the side where the counterweight 8 is disposed, at an intermediate section between the counterweight 8 and the door lock device 6.

Near the counterweight 8, the guide section 9 guides the operation cable 7 in a direction away from the motion range of the counterweight 8, which is shown by a chain line in FIG. 2, and therefore ensures prevention of the operation cable 7 from being caught on the counterweight 8.

Also, the operation cable 7 is guided in a state where it is only supported by the guide section 9. Thus, the operation cable 7 can be easily slid by load in the axial direction and easily separated from the guide section 9 by load in the vehicle width direction. This eliminates a situation where the guide section 9 restricts movement of the operation cable 7 and blocks the supply of an extra length portion to a dimensionally changed section.

Further, in this example, a plate-shaped guide member 14 is affixed to the door 1 and appropriately shapes the extra length securing pathway. As shown in FIG. 2, with an elongated guide protrusion 14a, the guide member 14 pushes the side face of the operation cable 7 toward the handle device 5 so that the curvature of the operation cable 7 near the counterweight 8 can be smaller than that in a free state without the guide by the guide section 9. In this way, the operation cable 7 is kept away from the motion range of the counterweight 8.

Like the guide section 9, the elongated guide protrusion 14a of the guide section 14 only pushes the operation cable 7 and does therefore not restrict the movement of the operation cable 7 in the axial direction or in the vehicle width direction.

EXPLANATION OF REFERENCE NUMERALS

1 DOOR
2 HANDLE BASE
3 OPERATION HANDLE
4 OUTPUT SECTION
5 HANDLE DEVICE
6 DOOR LOCK DEVICE
7 OPERATION CABLE
8 MOVABLE MEMBER
9 GUIDE SECTION
10 SPONGE-LIKE TUBE
11 CABLE COUPLING SECTION

The invention claimed is:

1. An operation cable routing structure comprising:
a handle device affixed to a door of a vehicle, the handle device including an operation handle rotatably coupled to a handle base, a movable member, and an output section that outputs an operation force applied to the operation handle;
a door lock device disposed in proximity to the output section of the handle device;
an operation cable that couples the output section of the handle device and the door lock device; and
a guide section that movably supports the operation cable; wherein
the operation cable extends from the output section to the door lock device via an extra length securing pathway that substantially encircles the handle device;
the guide section is provided on the handle base at an intermediate position between a portion of the operation cable and the movable member of the handle device;
the guide section restricts the operation cable from entering a range of motion of the movable member; and
the portion of the operation cable is coupled to the door lock device.

2. The operation cable routing structure according to claim 1, wherein the guide section supports the operation cable such that the operation cable is separated from the guide section when moved in a vehicle width direction.

3. The operation cable routing structure according to claim 1, further comprising a tube made of a spongy material mounted on a section of the operation cable that is supported by the guide section.

4. A handle device comprising:
a handle base affixed to a door of a vehicle;
an operation handle rotatably coupled to a first end of the handle base; and
an output section including a counterweight rotatably coupled to a side portion of a second end of the handle base, the counterweight being rotationally driven by displacement of a tip end of the operation handle at a circumference of rotation of the operation handle; wherein
the counterweight cancels out an inertia force applied to the door by a collision of an object with the door in a direction of opening the door;
a peripheral section of the handle base, opposite to a peripheral section of the handle base on which the output section is pivoted, includes a cable coupling section to which one end of an operation cable that displaces the output section out is coupled; and the peripheral section on which the output section is pivoted includes a guide section that movably supports the operation cable, which surrounds substantially an entire periphery of the handle base, and that restricts the operation cable from entering a range of motion the counterweight.

5. The handle device according to claim 4, wherein the guide section has a rectangular plate shape and, at one side edge, supports the operation cable such that the operation cable is separated from the guide section when moved in a vehicle width direction.

* * * * *